(12) United States Patent
Schindlauer et al.

(10) Patent No.: US 11,789,942 B2
(45) Date of Patent: Oct. 17, 2023

(54) DYNAMIC ASSET MONITORING AND MANAGEMENT USING A CONTINUOUS EVENT PROCESSING PLATFORM

(71) Applicant: Microsoft Technology Licensing, LLC, Redmond, WA (US)

(72) Inventors: Roman Schindlauer, Seattle, WA (US); Balan Sethu Raman, Redmond, WA (US); Torsten W. Grabs, Seattle, WA (US); Beysim Sezgin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/579,603

(22) Filed: Jan. 20, 2022

(65) Prior Publication Data
US 2022/0147518 A1   May 12, 2022

Related U.S. Application Data

(63) Continuation of application No. 16/548,515, filed on Aug. 22, 2019, now Pat. No. 11,243,946, which is a continuation of application No. 14/636,437, filed on Mar. 3, 2015, now Pat. No. 10,409,809, which is a
(Continued)

(51) Int. Cl.
| | |
|---|---|
| *G06F 16/245* | (2019.01) |
| *G06F 16/25* | (2019.01) |
| *G06F 16/2455* | (2019.01) |
| *G06F 16/2458* | (2019.01) |

(Continued)

(52) U.S. Cl.
CPC ...... *G06F 16/245* (2019.01); *G06F 16/24568* (2019.01); *G06F 16/258* (2019.01); *G06F 16/22* (2019.01); *G06F 16/2255* (2019.01); *G06F 16/2428* (2019.01); *G06F 16/2471* (2019.01)

(58) Field of Classification Search
CPC ............ G06F 16/245; G06F 16/24568; G06F 16/258; G06F 16/2471
See application file for complete search history.

(56) References Cited

U.S. PATENT DOCUMENTS

| | | | | |
|---|---|---|---|---|
| 8,316,012 | B2 * | 11/2012 | Abouzied | ........... G06F 16/2428 707/718 |
| 8,498,956 | B2 * | 7/2013 | Srinivasan | ............... G06K 9/62 706/45 |

(Continued)

*Primary Examiner* — Dangelino N Gortayo
(74) *Attorney, Agent, or Firm* — Chin IP, PLLC

(57) ABSTRACT

The disclosed architecture leverages realtime continuous event processing (CEP) to address using a general input interface framework to import a dynamic set of event types (e.g., assets), and using a declarative, expressive query model to implement monitoring and management tasks on an asset level. This is in contrast to looking separately at single values from static databases and/or realtime streams as is common conventionally. The architecture uses the CEP data model to model assets as realtime event types. Thus, queries can be formulated per asset and not just per single stream. The architecture uses the query capabilities of CEP to formulate asset management and monitoring tasks as standing, declarative queries, and uses the input interface of a CEP platform to correlate data from different data sources with different dynamic properties.

20 Claims, 7 Drawing Sheets

Related U.S. Application Data continuation of application No. 12/826,689, filed on Jun. 30, 2010, now Pat. No. 8,977,643.

(51) Int. Cl.
  *G06F 16/22* (2019.01)
  *G06F 16/242* (2019.01)

(56) References Cited

U.S. PATENT DOCUMENTS

| | | | |
|---|---|---|---|
| 8,725,707 B2* | 5/2014 | Chen | G06F 16/24565 |
| | | | 707/703 |
| 8,935,293 B2* | 1/2015 | Park | G06F 9/44521 |
| | | | 707/801 |
| 9,135,583 B2* | 9/2015 | Naibo | G06Q 10/06 |
| 2008/0114806 A1* | 5/2008 | Kosche | G06F 11/3495 |
| 2008/0177756 A1* | 7/2008 | Kosche | G06F 11/3476 |
| 2009/0037370 A1* | 2/2009 | Mishra | G06F 16/2471 |
| 2011/0023055 A1* | 1/2011 | Thatte | G06F 16/252 |
| | | | 707/E17.014 |

* cited by examiner

DYNAMIC ASSET MONITORING AND MANAGEMENT USING A CONTINUOUS EVENT PROCESSING PLATFORM

CROSS-REFERENCE TO RELATED APPLICATIONS

This application is a continuation of U.S. patent application Ser. No. 16/548,515, filed Aug. 22, 2019, entitled "DYNAMIC ASSET MONITORING AND MANAGEMENT USING A CONTINUOUS EVENT PROCESSING PLATFORM", which is a continuation of U.S. patent application Ser. No. 14/636,437, filed Mar. 3, 2015, entitled "DYNAMIC ASSET MONITORING AND MANAGEMENT USING A CONTINUOUS EVENT PROCESSING PLATFORM," now U.S. Pat. No. 10,409,809, issued Sep. 10, 2019, which is a continuation of U.S. patent application Ser. No. 12/826,689, filed Jun. 30, 2010, entitled "DYNAMIC ASSET MONITORING AND MANAGEMENT USING A CONTINUOUS EVENT PROCESSING PLATFORM," now U.S. Pat. No. 8,977,643, issued Mar. 10, 2015. The entirety of each of these afore-mentioned application(s) is incorporated herein by reference.

BACKGROUND

In vertical markets such as manufacturing, power utilities, financial services, health care, and data center management realtime asset monitoring and management is a challenge that requires the correlation of static and dynamic asset properties as well as the ability to specify complex queries over them. Commonly, the asset schema and hierarchy are stored in a specific metadata store, which contains information about the asset hierarchy and relationship to other assets. The actual asset property values have to be retrieved from other repositories, such as time-series databases (e.g., in the case of fast-changing asset properties), or relational storages (e.g., in the case of static or slowly changing properties). Monitoring and management tasks that are defined over a logical group of assets face the difficulty of having to operate on a dynamically changing set of single property values from separate stores. This makes the formulation of general, reusable queries without the hard-coded reference to such properties difficult or impossible.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture leverages realtime continuous event processing (CEP) to address using a general input interface framework to import a dynamic set of event types (e.g., assets), and using a declarative, expressive query model to implement monitoring and management tasks on an asset level. This is in contrast to looking separately at single values from static databases and/or realtime streams as is common conventionally. The architecture uses the CEP data model to model assets as realtime event types. Thus, queries can be formulated per asset type rather than over single values from a fixed set of data sources. The architecture uses the query capabilities of CEP to formulate asset management and monitoring tasks as standing, declarative queries, and uses the input interface of a CEP platform to correlate data from different data sources with different dynamic properties.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
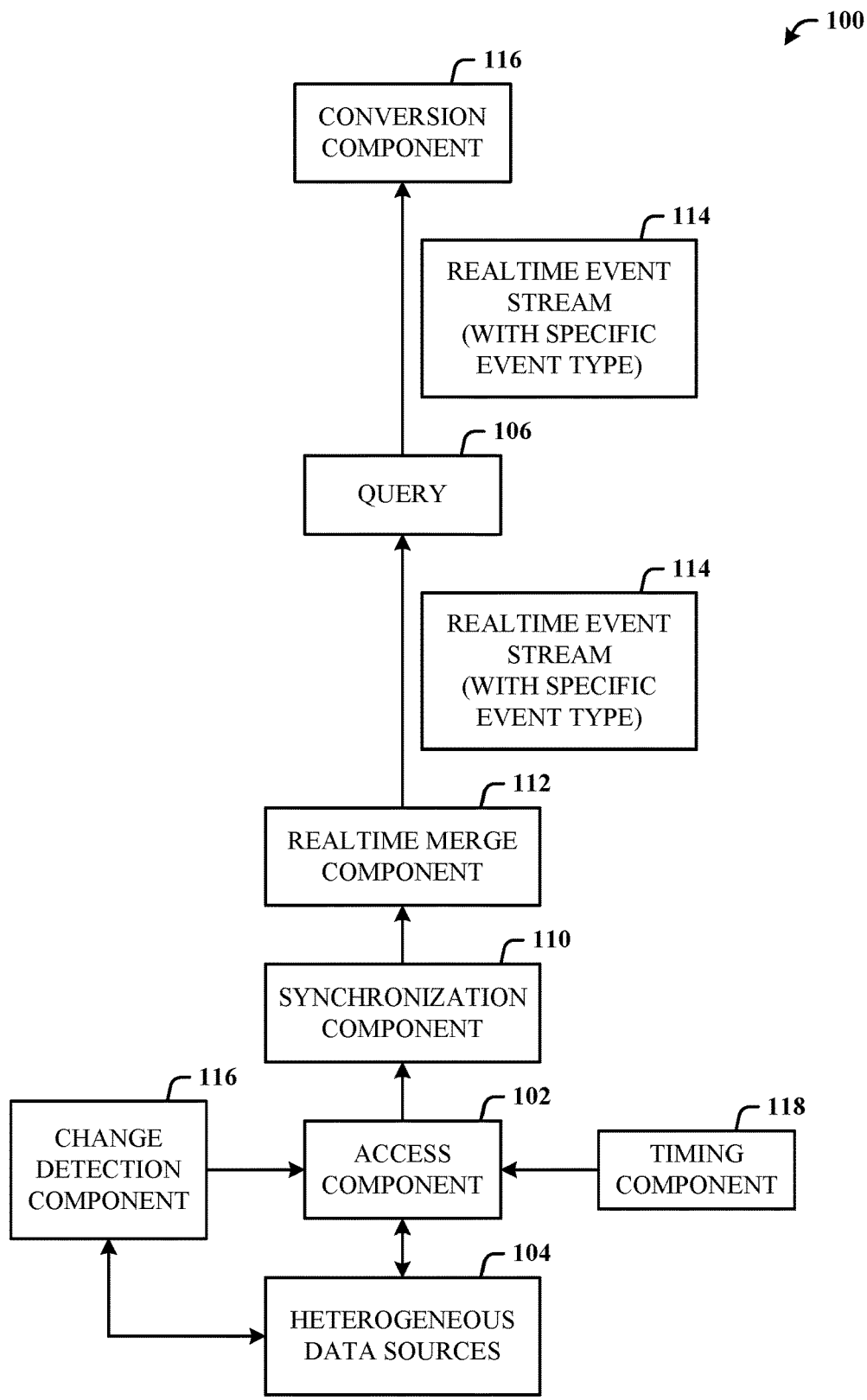
FIG. 1 illustrates a realtime event processing system in accordance with the disclosed architecture.

Asset management and monitoring typically comprises queries over a set of asset properties in realtime or from historical data. Such queries can either calculate new, derived asset properties or generate trends for further processing, such as visualization or alarm triggering. Assets can be physical entities such as technical equipment, or logical entities such as the collection of equipment with a common location.

For monitoring and management, assets are represented as a specific set of properties. The asset "server" may consist of power consumption data, performance data, and static data describing a physical location, for example. The asset "pump" may contain a set of sensor value streams measuring pressure, flow, chemical features, and static data about operating thresholds.

Typically, realtime asset data is collected, stored, and processed separately from static and slowly changing ("metadata") asset data. Realtime values are commonly inserted and stored in data sources that are specialized in historical time-series (the data sources support fast inserts and retrievals of such data). On the other hand, metadata is stored in classical relational databases that support complex data models and referential integrity.

Monitoring and managing assets in realtime implies the specification of standing queries over multiple asset properties. The standing query is expected to deliver a result for the points in time whenever any asset property changes. In other words, the query author expects to have access to all asset properties in a realtime, synchronized way. The challenge lies in the fact that properties of the same asset have to be retrieved from different data stores, and that updates of these properties are most likely not synchronized in time.

A suitable framework for continuous event processing (CEP) can facilitate the creation and maintenance of an asset stream, which represents the entire asset (the subset of asset properties needed for a specific management or monitoring task) changing over time as a single entity. In this respect, each realtime event in the CEP engine represents the snapshot of an asset at a specific point in time.

Following are at least four challenges to address: accessing heterogeneous data sources to retrieve realtime and metadata for a single asset, synchronizing these data items in time, applying complex, standing queries on the realtime asset stream, and preparing the query result for multiple destinations, such as historical storage or visualization.

With respect to access to heterogeneous data sources, this can be handled by an input interface (or input adapter) of the CEP platform, which implements the translation of event data from proprietary data sources to the canonical event representation of the realtime query engine. Depending on the event model of the CEP platform, the data model of this event representation can be of arbitrary complexity. An asset can be represented as a flat schema of multiple columns (corresponding to a row in the relational model) or as a structure of nested records.

For the dynamic asset management scenario, the input adapter undertakes the task of importing the desired set of assets into the realtime query engine. In common management and monitoring use cases, only a specific set of assets is considered (constrained, for instance, by type or location). Moreover, not all properties of an asset might be relevant to one specific task. The input adapter and the underlying metadata access framework ensure that the right set of asset properties is imported at any given point in time. The dynamic aspect not only consists of the realtime behavior of asset properties, but also of the fact that entire assets can enter and leave the set intended to be managed or monitored (e.g., by the relocation of a specific asset during the observation, in case the location is one of the set-defining properties). Changes in this set can be propagated to the input adapter through a change detection mechanism in the metadata store in order to avoid constant polling from the adapter.

With respect to the challenge of time synchronization, the time synchronization can either be accomplished by the input adapter or partly by the query itself. In the first case of the input adapter, the adapter author is tasked with retrieving all needed asset properties in a synchronized fashion so that the properties can correctly be converted into a single event with a single, common timestamp. In the second case of the query, the adapter author feeds subsets of properties into the query as separate data types and then uses a suitable query to synchronize the property subsets and assemble the entire asset type.

Following is a general description of realtime event processing in terms of realtime event types, which can be assets. The disclosed architecture leverages CEP technology to address using a general input interface framework to import a dynamic set of event types (e.g., assets) into a CEP engine, and using a declarative, expressive query model to implement monitoring and management tasks on an asset level. This is in contrast to looking separately at single values from static databases and/or realtime streams as is common conventionally. The architecture uses the data model of a CEP platform to model assets as a realtime event type, so that queries can be formulated per asset and not just per single stream, uses the query capabilities of a CEP platform to formulate asset management and monitoring tasks as standing, declarative queries, and uses the input interface of a CEP platform to correlate data from different data sources with different dynamic properties.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a realtime event processing system 100 in accordance with the disclosed architecture. The arrows indicate generally that communications can be employed between the entities and from one entity to another to send information and/or receive information, which can include, but is not limited to, data and control signals. The system 100 includes an access component 102 that accesses heterogeneous data sources 104 of event data, for a query 106 expecting a specific event type for an asset. The event type can be a composite of multiple related event items. A synchronization component 110 synchronizes realtime event data and static event data associated with the event type as obtained from the heterogeneous data sources 104. A realtime merge component 112 merges (e.g., joins) the synchronized realtime event data and static event data into a realtime event stream 114. As shown, the input to and output from the query 106 can be the realtime event stream 114.

The system 100 can further comprise a conversion component 116 that converts the single realtime event stream 114 into a format suitable for a desired destination such as a consumer application (not shown). In other words, the conversion component 116 prepares the query output for consumption by one or more destinations (e.g., historical storage, visualization, etc.). The event type can be an asset (e.g., equipment) having static asset properties as the static event data and realtime asset properties as the realtime event data. The asset is queriable as a single event type in a continuous event processing platform (the event processing system 100) to return multiple related asset items. The query can be a standing declarative query.

The system 100 can further comprise a change detection component 116 that signals the access component 102 of a change in information one or more of the heterogeneous sources 104 related to the event type. The synchronization component 110 synchronizes the realtime event data and static event data in time. The synchronization component 110 includes an emittance module that ensures actual values of the realtime event data are obtained from a same point in time for each individual asset. The realtime merge component 112 can include a join operator that merges realtime event data and static event data of corresponding event types into a single composite realtime event stream. The system 100 can further comprise a timing component 118 that clocks input of the query 106 to achieve a predetermined output frequency. The timing component 118 is a (logical) module that can trigger the data retrieval at certain times, independently of (and possibly more frequently than) the change detection component 116.

Put another way, the realtime event processing system includes the access component that accesses heterogeneous data sources of event data, for a query expecting a specific event type of an asset. The event type is a composite of multiple related event items. The system includes the synchronization component that synchronizes realtime event data and static event data associated with the event type as obtained from the heterogeneous data sources, the realtime merge component that merges the synchronized realtime event data and static event data into a realtime event stream, the conversion component that converts the realtime event stream into a format compatible with a consumer application, and the timing component that clocks input of the query in the format to the consumer application.

The event type corresponds to a type of assets having static asset properties as the static event data and realtime asset properties as the realtime event data, the asset queriable as a single event type in a continuous event processing platform to return multiple related asset items. The system further comprises the change detection component that signals the access component of a change in information related to the event type. The synchronization component includes an emittance module that ensures actual values of the realtime event data are obtained from a same point in time. The realtime merge component includes a join operator that merges realtime event data and static event data of corresponding event types into a single composite realtime event stream.

Figure 2:
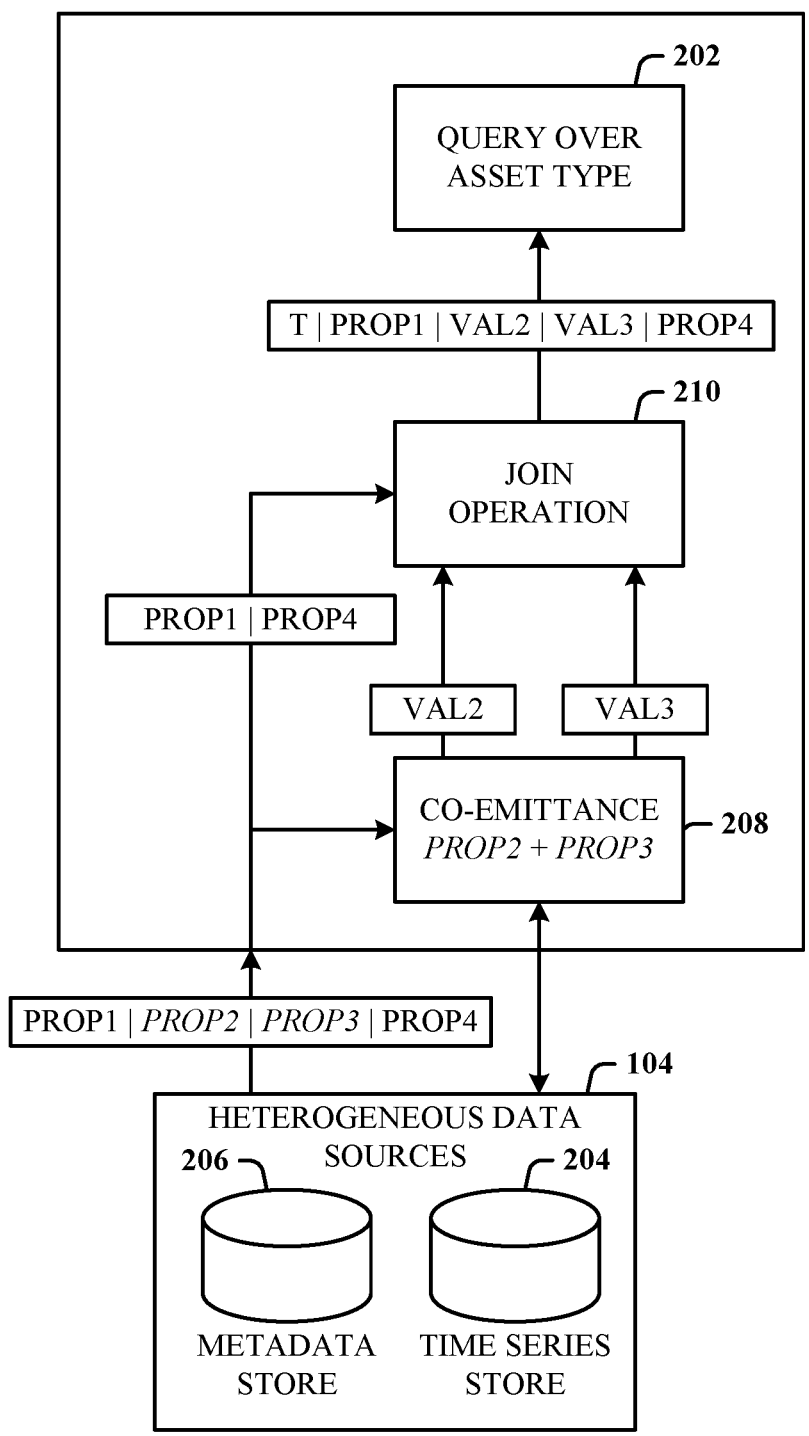
FIG. 2 illustrates an alternative embodiment of a realtime event processing system.

FIG. 2 illustrates an alternative embodiment of a realtime event processing system 200. Here, the event type represents a type of assets that should be monitored by a query. The asset type that the query 202 is defined over includes two static properties (prop1 and prop4), and two realtime properties (prop2 and prop3) (realtime data denoted in italic font). The realtime properties are retrieved from the heterogeneous data sources 104 that include a time-series store 204 (the realtime event data) (assuming the store 204 provides historical time-series as well as the current snapshot of the realtime data). The static event data is obtained from a metadata store 206.

The retrieval process includes co-emittance module 208 (as part of the access component 102) which ensures the import of the actual realtime values of prop2 and prop3 at the same point in time. The corresponding time-series of val2 (for prop2) and val3 (for prop3) are then joined (as part of the merge component 112) with the static portion (prop1 and prop4) of the asset using a join operation 210. The join operation 210 is only one example of merging the related asset properties, and can be carried out by an input adapter implemented for such purposes or by a join operator in the actual query. The result of the join operation 210 includes all asset property values for a specific timestamp T and is the input to an actual asset management and monitoring query (the query 106 and query 202).

The co-emittance module 208 and subsequent join operation 210 can be specific to the import of a single asset. Where an entire set of assets are imported into the query 202, this implies that for each asset, a separate co-emittance and join branch (the module 208 and join operation 210) can be maintained. The output of the branches is then merged into a single stream through a join operation.

The query (a continuous event processing query (CEP)) itself represents the actual monitoring and management task, and comprises a graph of query operators. An asset query can leverage several CEP features such as complex filters, calculations on asset properties, and temporal behaviors such as time windows, sampling intervals, or reordering. Moreover, a lookup operator can be provided as another way of importing reference data into the realtime query. Such reference data can be unspecific to a particular asset, but still needed in the query formulation. Eventually, an output adapter framework handles conversion of the query result into the desired destination format for one or more consumer applications.

Figure 3:
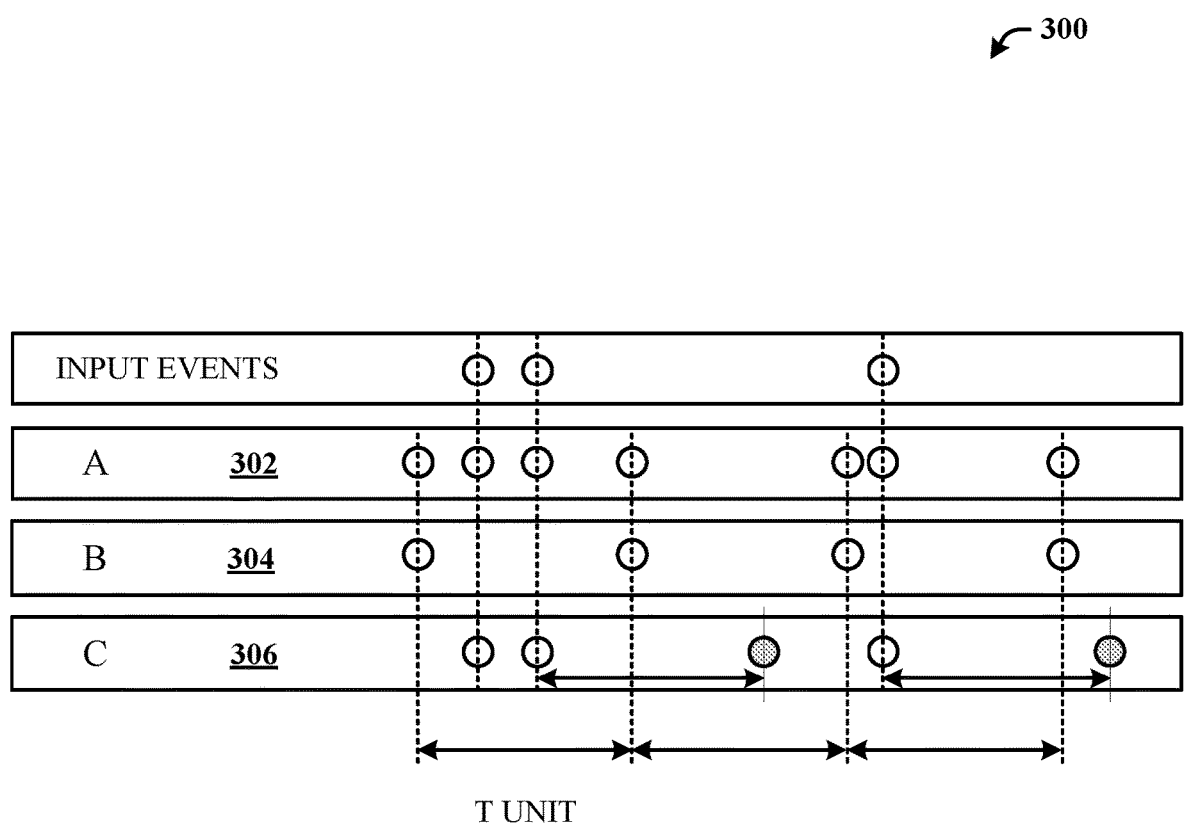
FIG. 3 illustrates a diagram that depicts a liveliness operational parameter.

FIG. 3 illustrates a diagram 300 that depicts a liveliness operational parameter (e.g., of asset management). The liveliness parameter determines the frequency of the realtime query output. Displayed are input events (as circles) (new tag values from the time-series store 204) and the resulting events that exit the co-emittance module 208 along system time (increasing left to right). The grayed circles are events that represent artificially created events carrying the last seen value, as opposed to actual new values being inserted from the realtime input.

At least three behaviors can be differentiated: Option A (302), where results are issued at least every X time units (e.g., seconds) (results may occur more frequently); Option B (304), where results are issued exactly every X time units (e.g., seconds), and, Option C (306), where results are issued when events arrive from the source and arrive in the output with a latency of at most X time units later (e.g., seconds).

With respect to Option A, an external clock (timing component 118) can be employed to force query output even if no incoming realtime stream signals a new value. Such a clock stream feeds into each co-emittance module (for multiple assets or event types) and acts as a trigger to the modules to retrieve (e.g., lookup) last seen values from each realtime stream by releasing a clock tick every X time units. Thus, realtime values can be released into the join whenever the clock triggers or the value in the time-series store 204 changes.

With respect to Option B, this works similarly to Option A, except that the clock tick triggers an output from the co-emittance module 208. Here, the clock feeds a dedicated input, whereas the last values are only read from the time-series store 204, and not pushed into the co-emittance module 208. The data flow between the time-series store 204 and the CEP engine remain pull-only, since realtime value changes are no longer pushed from the time-series store 204.

Option C is similar to Option A, except that Option C falls back to the clocked lookup only if no time-series changes have been propagated from the time-series store 204. Logically, this corresponds to a timer that is restarted with every new incoming value. Such a latency threshold can be implemented by advancing application time (e.g., through "heartbeat" events) at the correct points in time.

Figure 4:
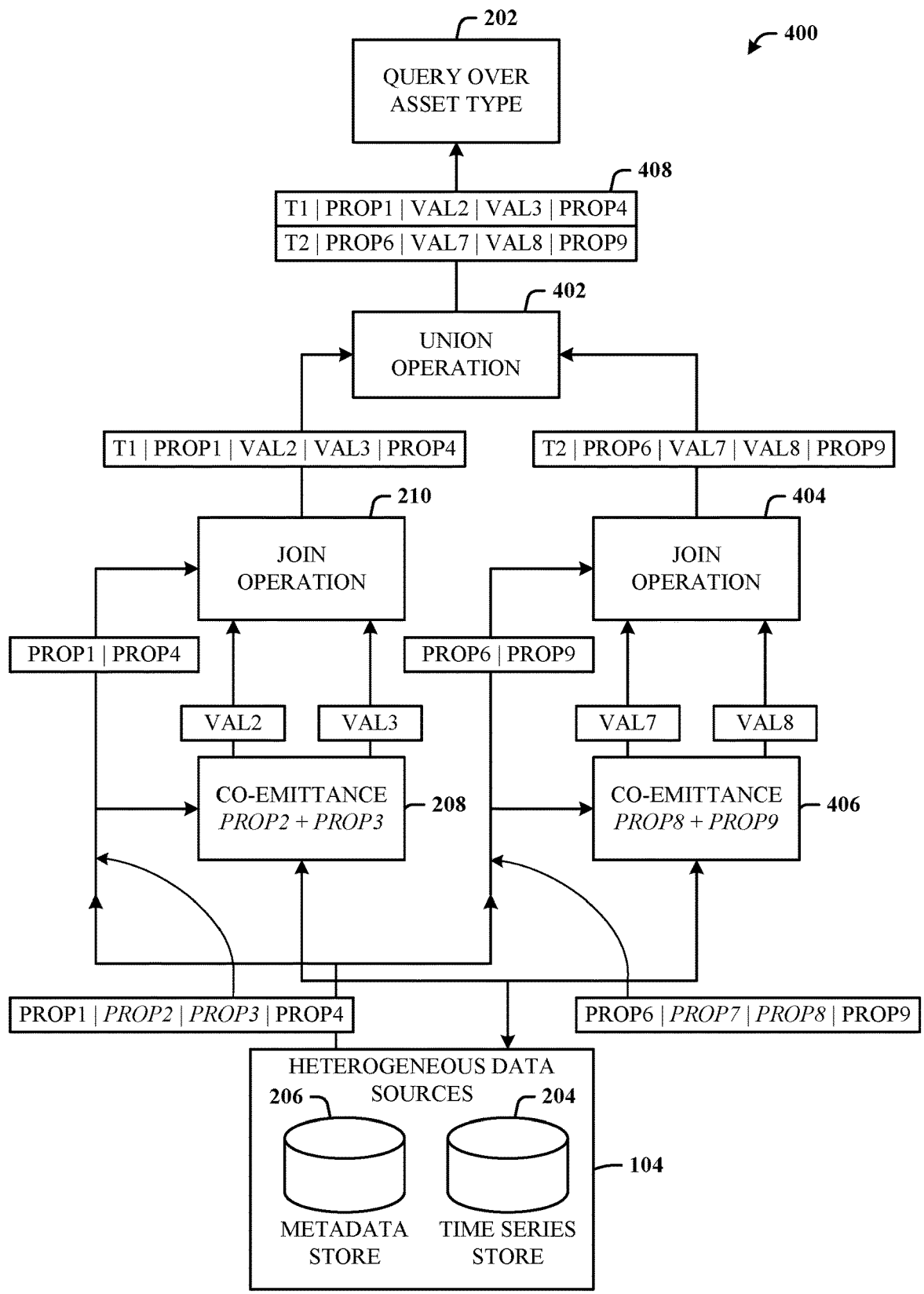
FIG. 4 illustrates a system where the query is executed over multiple assets using a union operator.

FIG. 4 illustrates a system 400 where the query is executed over multiple assets using a union operator 402. Here, the first asset is associated with the static properties of prop1 and prop4 and the realtime properties of prop2 and prop3. A second asset is associated with the static properties prop6 and prop9 and realtime properties of prop7 and prop8. A dedicated join operation 404 and co-emittance module 406 are employed for the second asset. The first co-emittance module 208 ensures the import of the actual realtime values of prop2 and prop3 at the same point in time. The output of the first join operation 210 is the static properties and realtime values for a first asset at a timestamp T1. The second co-emittance module 406 ensures the import of the actual realtime values of prop7 and prop8 at the same point in time. The output of the second join operation 404 is the static properties and realtime values of a second asset at a timestamp T2. The synchronized outputs of the respective join operations (210 and 404) are merged using the union operation 402 (as part of the realtime merge component 112) into a single realtime event stream 408 of as separate rows for input to the query 202, describing both assets.

Note that with respect at least to FIG. 2 and FIG. 4, the association of each imported asset with a single stream, feeding into a separate join operator, followed by a common union operator, is merely the logical query structure. In practice, the query specified by the query author needs only a single, suitably defined join operator, applied to a physical stream that contains events that represent all assets.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
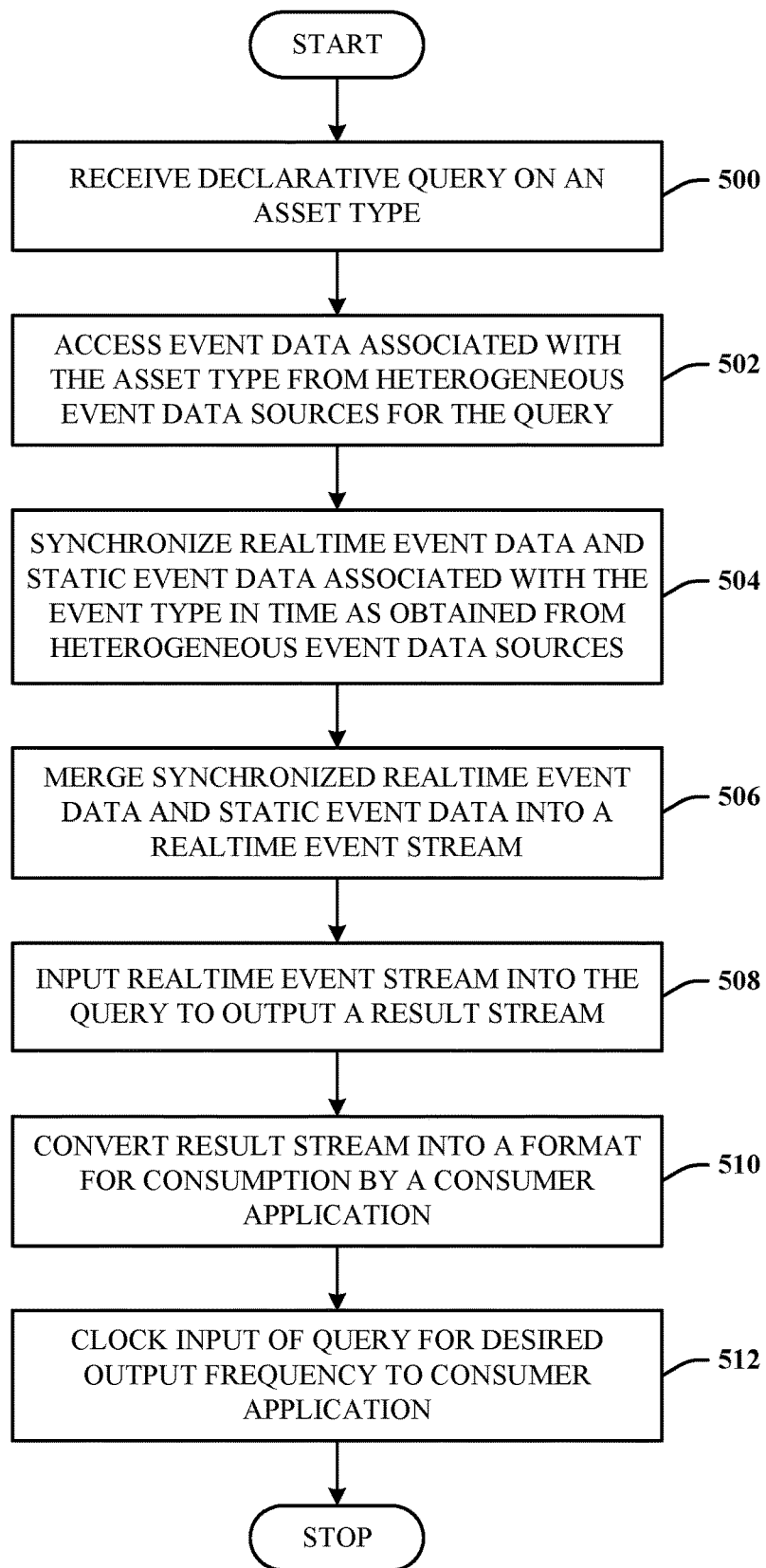
FIG. 5 illustrates a realtime event processing method in accordance with the disclosed architecture.

FIG. 5 illustrates a realtime event processing method in accordance with the disclosed architecture. At 500, a declarative query over an asset type is received. At 502, event data associated with the asset type is accessed from heterogeneous event data sources for the query. At 504, realtime event data and static event data associated with the event type are synchronized in time as obtained from the heterogeneous event data sources. At 506, the synchronized realtime event data and static event data are merged into a realtime event stream. At 508, the realtime event stream is input into the query to output a result stream. At 510, the result stream is converted into a format for consumption by a consumer application. At 512, the input of the query is clocked for the desired output frequency to the consumer application.

Figure 6:
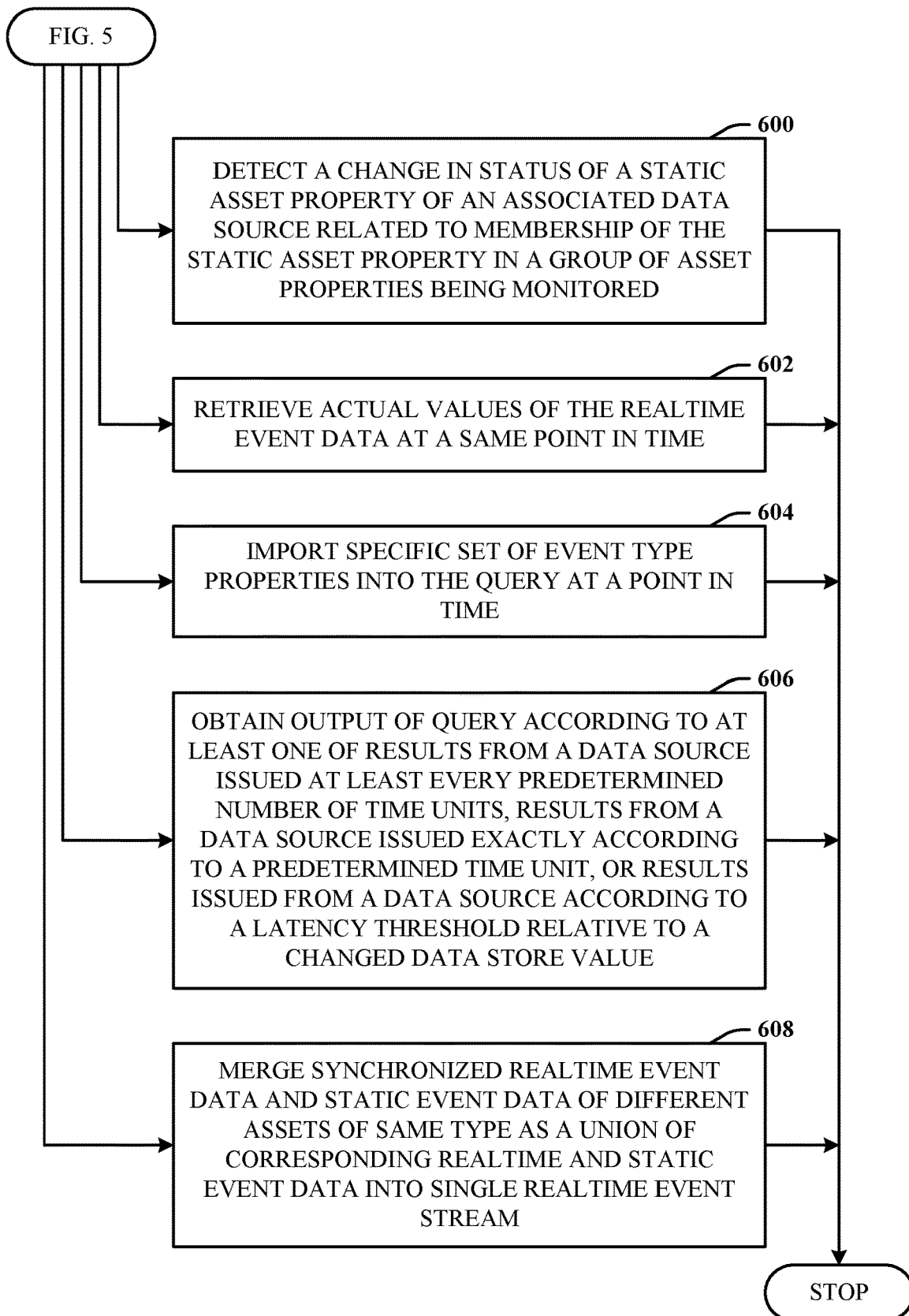
FIG. 6 illustrates further aspects of the method of FIG. 5.

FIG. 6 illustrates further aspects of the method of FIG. 5. As shown, each block represents a separate and additional step that can be read in combination with the steps of the method of FIG. 5, and as further represented in the claims. At 600, a change in status of a static asset property of an associated data source is detected related to membership of the static asset property in a group of asset properties being monitored. At 602, actual values of the realtime event data are retrieved at a same point in time. At 604, a specific set of event type properties is imported into the query at a point in time. At 606, the output of the query is obtained according to at least one of results from a data source issued at least every predetermined number of time units, results from a data source issued exactly according to a predetermined time unit, or results issued from a data source according to a latency threshold relative to a changed data source value. At 608, synchronized realtime event data and static event data of different asset types are merged as a union of the corresponding realtime and static event data into a realtime event stream.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
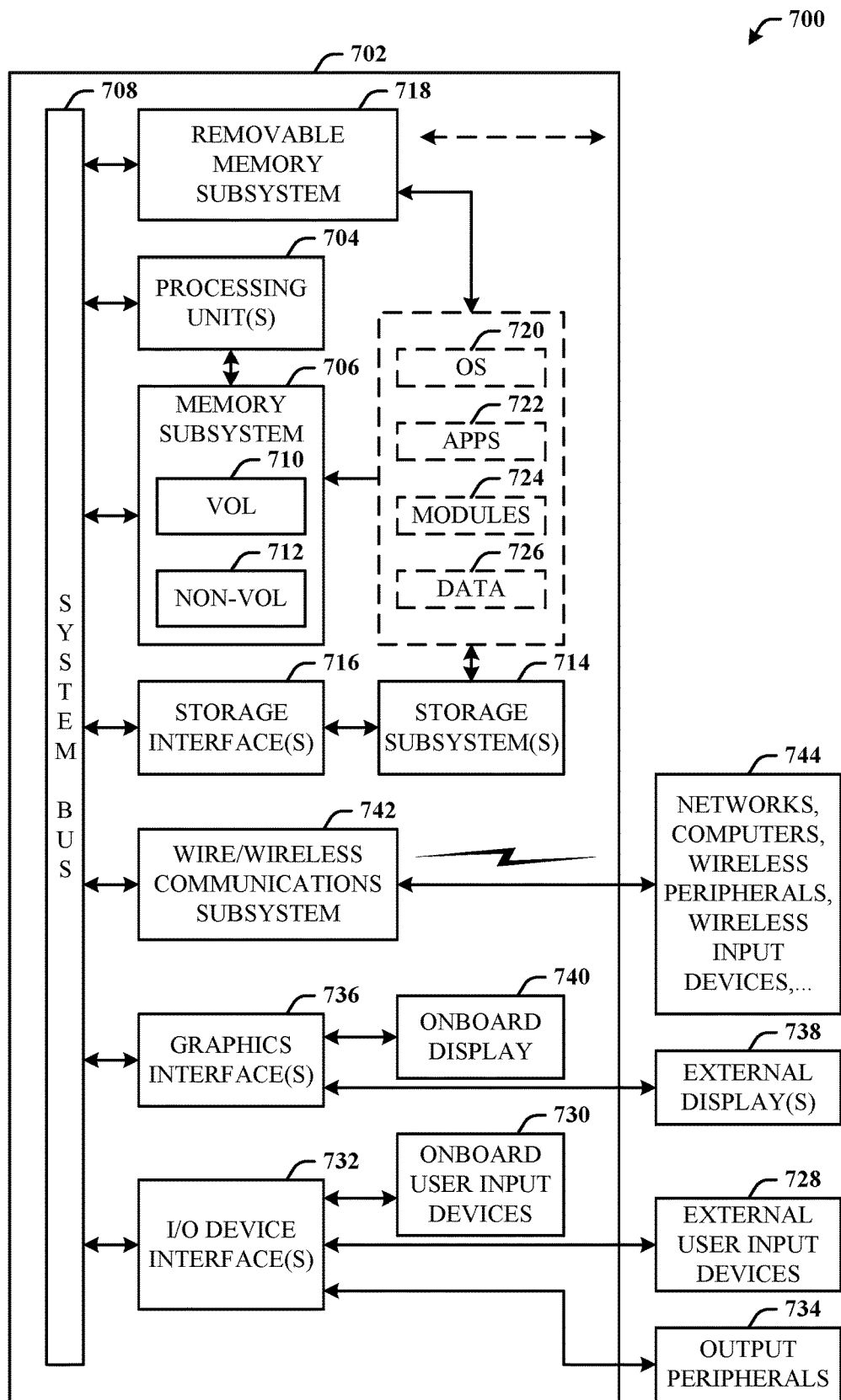
FIG. 7 illustrates a block diagram of a computing system that executes dynamic event type monitoring and management in realtime event processing in accordance with the disclosed architecture.

Referring now to FIG. 7, there is illustrated a block diagram of a computing system 700 that executes dynamic event type monitoring and management in realtime event processing in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of system 100 of FIG. 1, the entities and components of system 200 of FIG. 2, the diagram 300 and liveliness parameter of FIG. 3, the entities and components of system 400 of FIG. 4, and the methods represented by the flow charts of FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
a memory and a processor, wherein the memory and the processor are respectively configured to store and execute instructions, including instructions for causing the computing device to perform operations, the operations including:
providing a standing query;
synchronizing realtime event data regarding a plurality of assets and static event data regarding the plurality of assets, the synchronizing including obtaining the realtime event data for each of the plurality of assets, the realtime event data for each of the plurality of assets representing that asset at a specific point in time, and the specific point in time for each of the plurality of assets being a same point in time;
merging the synchronized realtime event data regarding the plurality of assets and the static event data regarding the plurality of assets, using one or more operators, into an event stream; and
responsive to a changed data source value:
inputting the event stream as a single event type into the standing query; and
outputting multiple assets of the plurality of assets that match the standing query as output of the standing query according to a latency threshold relative to the changed data source value.

2. The computing device of claim 1, wherein the standing query is a continuous event processing query.

3. The computing device of claim 1, wherein the query is a standing declarative query.

4. The computing device of claim 1, the operations further including:
signaling a change in information related to an asset.

5. The computing device of claim 4, the operations further including:
detecting a change in status of a static asset property of the associated data source related to membership of the static asset property in a group of asset properties being monitored using the standing query.

6. The computing device of claim 1, the operations further including:
confirming actual values of the realtime event data are obtained for the same point in time for each individual asset.

7. The computing device of claim 1, wherein the one or more operators include a join operator configured to merge realtime event data and static event data of corresponding assets into a single composite event stream, and a union operator configured to merge realtime event data and static event data of different assets of the same type into the event stream.

8. The computing device of claim 1, wherein the standing query is formulated per asset.

9. A method for processing event data, the method comprising:
providing a standing query;
synchronizing realtime event data regarding a plurality of assets and static event data regarding the plurality of assets, the synchronizing including receiving the realtime event data for each of the plurality of assets, the realtime event data for each of the plurality of assets representing that asset at a specific point in time, and the specific point in time for each of the plurality of assets being a same point in time;
merging the synchronized realtime event data regarding the plurality of assets and static event data regarding the plurality of assets using one or more operators into an event stream; and
responsive to a changed data source value, inputting the event stream as a single event type into the standing query to output a result stream of multiple related asset items according to a latency threshold relative to the changed data source value, the event stream queriable as a single event type.

10. The method of claim 9, further comprising detecting a change in status of a static asset property of the data source related to membership of the static asset property in a group of asset properties being monitored.

11. The method of claim 9, further comprising retrieving actual values of the realtime event data at the same point in time.

12. The method of claim 9, further comprising importing a specific set of event type properties into the standing query.

13. The method of claim 9, wherein the standing query is a continuous event processing query.

14. The method of claim 9, further comprising merging synchronized realtime event data and static event data of different assets of the same type using an operator as a union of corresponding realtime and static event data into a single event stream.

15. The method of claim 9, further comprising receiving the standing query as a standing declarative query over an asset as a single asset type that comprises a composite of the static and realtime asset properties.

16. A computer-readable storage device having computer-executable instructions stored therein that, in response to execution, cause a computing device to perform operations, the operations comprising:
providing a standing query;
synchronizing realtime event data associated with a plurality of assets and static event data associated with the plurality of assets, the synchronizing including obtaining the realtime event data for each of the plurality of assets for a same point in time;
merging the synchronized realtime event data and the static event data into an event stream using one or more operators; and
responsive to a changed data source value:
inputting to the event stream as the single event type to the standard query, the event stream queriable as a single event type; and
returning multiple related assets items as an output of the standing query according to a latency threshold relative to the changed data source value.

17. The computer-readable storage device of claim 16, the operations further comprising detecting a change in status of a static asset property of the data source related to membership of the static asset property in a group of asset properties being monitored.

18. The computer-readable storage device of claim 16, the operations further comprising merging synchronized realtime event data and static event data of different assets of the same type using an operator as a union of corresponding realtime and static event data into a single event stream.

19. The computer-readable storage device of claim 16, wherein the standing query is a continuous event processing query.

20. The standing query is a standing declarative query for the single asset type that comprises a composite of the static and realtime asset properties.

\* \* \* \* \*